US012795050B2

(12) United States Patent
Logan

(10) Patent No.: US 12,795,050 B2
(45) Date of Patent: Nov. 10, 2026

(54) CROWDSOURCING, CAPTURING AND MEASURING DATA FROM THE USE OF MULTIPLE MOBILE APP SENSORS

(71) Applicant: L2 CONSULTING, LLC, Springfield, VA (US)

(72) Inventor: Lenval Logan, Springfield, VA (US)

(73) Assignee: L2 CONSULTING, LLC, Springfield, VA (US)

( * ) Notice: Subject to any disclaimer, the term of this patent is extended or adjusted under 35 U.S.C. 154(b) by 15 days.

(21) Appl. No.: 19/121,731

(22) PCT Filed: Oct. 18, 2023

(86) PCT No.: PCT/US2023/077196
§ 371 (c)(1),
(2) Date: Apr. 16, 2025

(87) PCT Pub. No.: WO2024/086649
PCT Pub. Date: Apr. 25, 2024

(65) Prior Publication Data

US 2026/0149791 A1 May 28, 2026

Related U.S. Application Data

(60) Provisional application No. 63/417,241, filed on Oct. 18, 2022.

(51) Int. Cl.
*H04N 7/18* (2006.01)
*G06F 16/51* (2019.01)
(Continued)

(52) U.S. Cl.
CPC ............. *H04N 7/181* (2013.01); *G06F 16/51* (2019.01); *H04M 1/72421* (2021.01); *H04M 1/72454* (2021.01); *H04M 2250/52* (2013.01)

(58) Field of Classification Search
None
See application file for complete search history.

(56) References Cited

U.S. PATENT DOCUMENTS

2005/0240378 A1* 10/2005 Smith ................... H04W 4/024
702/188
2015/0358796 A1 12/2015 Sarna, II
(Continued)

OTHER PUBLICATIONS

International Search Report and Written Opinion of the ISA for PCT/US2023/077196, mailed Feb. 15, 2024, 17 pages.

*Primary Examiner* — Heather R Jones
(74) *Attorney, Agent, or Firm* — Hauptman Ham, LLP

(57) ABSTRACT

With the widespread ubiquitous connectivity to smartphones and the Internet and social networks, software applications and cameras have become commonplace for individuals in our daily lives. We take pictures and videos of all kinds of events, goods and situations on our smartphones, easily upload them to cloud services, and with friends, family and others who subscribe or follow our shared content. However, through the use of all this technology we do not do a very job of recording the entirety of data available since other sensors are not utilized in the capturing of a significant, fleeting event, such as a UFO sighting, suspected criminal conduct, etc. Embodiments allow users to employ numerous sensors and other data to capture information about an event.

20 Claims, 4 Drawing Sheets

(51) Int. Cl.
*H04M 1/72421* (2021.01)
*H04M 1/72454* (2021.01)

(56) References Cited

U.S. PATENT DOCUMENTS

| | | | | |
|---|---|---|---|---|
| 2015/0365246 | A1* | 12/2015 | Kane | H04W 4/021 709/203 |
| 2017/0086050 | A1* | 3/2017 | Kerning | H04W 4/026 |
| 2017/0180961 | A1* | 6/2017 | Gauglitz | H04W 4/21 |
| 2018/0034654 | A1* | 2/2018 | Mumme | H04W 12/02 |
| 2019/0268426 | A1* | 8/2019 | Maguire | H04L 67/125 |
| 2020/0286197 | A1* | 9/2020 | Stivi | G06Q 50/265 |

* cited by examiner

CROWDSOURCING, CAPTURING AND MEASURING DATA FROM THE USE OF MULTIPLE MOBILE APP SENSORS

CROSS-REFERENCE TO RELATED APPLICATIONS

This application is the U.S. national phase of International Application No. PCT/US2023/077196 filed Oct. 18, 2023, which designated the U.S. and claims priority to U.S. Provisional Patent Application No. 63/417,241 filed Oct. 18, 2022, the entire contents of each of which are hereby incorporated by reference.

STATEMENT REGARDING GOVERNMENT SUPPORT

None.

FIELD OF THE INVENTION

The present disclosure relates to crowd sourcing the use of mobile device features including camera and sensors to capture, record, record, storage, transmit, identify, correlate, analyze, and verify certain activity, such as suspected child trafficking, unexplained phenomena.

With the widespread ubiquitous connectivity to smartphones and the Internet and social networks, software applications and cameras have become commonplace for individuals in our daily lives. However, the functionality available to large groups of users and society as a whole are underused. People having mobile devices record photographs and videos of all kinds of events, goods, and situations on, e.g., smartphones—with geolocation and other useful metadata, easily upload them to various cloud services, and share with friends, family, and others who subscribe or follow shared content. As disclosed herein, the camera and sensor capabilities may be harnessed in a variety of ways to enable a wide array of beneficial uses.

BACKGROUND—INTRODUCTION

With the widespread ubiquitous connectivity to smartphones and the Internet and social networks, software applications and cameras have become commonplace for individuals in our daily lives. We take pictures and videos of all kinds of events, goods and situations on our smartphones, easily upload them to cloud services, and with friends, family and others who subscribe or follow our shared content. However, through the use of all this technology we do not do a very job of recording the entirety of data available since other sensors are not utilized in the capturing of a significant event.

BRIEF SUMMARY

User mobile devices connected to the Internet and other data sharing networks, such as smartphones and smart pads, are becoming more ubiquitous around the world. Embodiments of the present approach advantageously capture fleeting sensor data of or relating to target activities, such as unexplained events, and disseminate the data quickly to other individuals, so that they may also try to capture information on the fleeting event as well. The present approach is applicable to a wide range of fleeting events, including, for example, aircraft spotting, endangered animal monitoring, unidentified object monitoring, paranormal activity investigators, criminal activity, and the like. For example, there are aircraft spotters, nature watchers, ghost hunters, law enforcement, and animal activists monitoring and documenting events for prosperity. The present approach provides a platform that may be utilized on one or more mobile or stationary electronic devices (e.g., smartphone apps) by the skeptics, believers, and in-betweeners, who are trying to capture and understand unusual and anomalous events such as UFOs/UAPs, Paranormal activities and Cryptozoological sighting that require automated Multi-Sensory documentation of anomalous activity in near-real time.

Security cameras around the home or office are widely used. Recorded video is typically available to users for a period of time and is accessible in real time through a smartphone software application or website. The multi-camera system stores video feeds from different cameras around the home and makes the different feeds available to users through a common user interface. Some services offer the ability to share these videos with other users not only through social networks, but also based on other factors settings. For example, Bot Home Automation in Santa Monica, California offers a front doorbell with a camera called the Ring. Customers can access the video from the Ring camera through the website ring.com. One feature of the Ring system is called "Ring Neighborhoods" (described at https://ring.com/neighborhoods). Users can set a radius around their home with the Ring camera and be automatically notified when other users within the set radius share the video on the Ring platform. Users can share videos that other users in the neighborhood may be interested in, such as videos showing package delivery thefts or malfeasants. However, such systems require users to review all of their videos to find videos that may be of interest and upload the videos they find to share with other Ring users within a pre-defined distance range. This is a significant drawback and limitation of conventional systems.

Some embodiments of the present approach may take the form of a system for near-real time data collection and dissemination. The system may include a plurality of user mobile electronic devices, each mobile electronic device having at least one sensor, at least one camera, at least one communication channel configured to send and receive data, local non-transient memory configured to store data generated by the at least one sensor, data generated by the at least one camera, and data received, and a mobile device processor configured to send an event report and event data, receive an event alert and alert data, and send and receive event information and data, through the at least one communication channel. Upon receiving an event alert and alert data, as described below, the mobile device processor is configured to store data generated by the at least one sensor and data generated by the at least one camera as data associated with an event. In some embodiments, the at least one sensor is selected from the group consisting of an accelerometer, a gyroscope, magnetometer, barometer, proximity measurement, light sensor, and GPS. It should be appreciated that a user mobile device may have a plurality of sensors. The communication channel may be one or more of Wi-Fi connectivity, Bluetooth connectivity, cellular connectivity, and near-field communication.

The system also includes at least one hardware server having a processor configured to receive a first event report and first event data from a first user mobile electronic device pertaining to a first event, identify a first plurality of user mobile electronic devices, transmit a first event alert and first alert data to the first plurality of user mobile electronic devices, receive event information and data associated with the first event from the first plurality of user mobile electronic devices. The at least one hardware server processor is further configured to store in a database the first event report, the first event data, received event information, and received data associated with the first event.

The first event is preferably one of aircraft spotting, endangered animal monitoring, unidentified object monitoring, paranormal activity, and criminal activity. The hardware server processor calculates at least one of first event location, first event direction, first event altitude, and first event predicted future location, based on the first event data. The data is provided by user devices near-real time, to the calculated event properties are likewise near-real time and may be distributed to other user devices. The hardware server processor may be further configured to transmit the calculated at least one of first event location, first event direction, first event altitude, and first event predicted future location, to the first plurality of user mobile electronic devices. In some embodiments, the hardware server processor is further configured to calculate at least one of first event location, first event direction, first event altitude, and first event predicted future location, based on received event information and data associated with the first event. In some embodiments, the at least one hardware server processor is further configured to transmit the calculated at least one of first event location, first event direction, first event altitude, and first event predicted future location, to at least one of the first user mobile electronic device and the first plurality of user mobile electronic devices.

In some embodiments, the hardware server processor is further configured to transmit a change alert to at least one of the first user mobile electronic device and the first plurality of user mobile electronic devices, the change alert comprising an indication of a change in at least one of the first event location, the first event direction, the first event altitude, and the first event predicted future location. In some embodiments, the hardware server processor is further configured to identify a second plurality of user mobile electronic devices based on at least one of the first event location, the first event direction, the first event altitude, and the first event predicted future location; transmit a second event alert and second alert data to the second plurality of user mobile electronic devices; and receive event information and data associated with the first event from the second plurality of user mobile electronic devices. In some embodiments, the received data associated with the first event includes a plurality of images and associated location data, and the at least one hardware server processor is further configured to generate and store in the database a composite image of the first event based on the plurality of images and associated location data, and transmit the composite image of the first event to at least one of the first user mobile electronic device and at least one member of the first plurality of user mobile electronic devices.

In some embodiments, the hardware server processor is further configured to transmit to at least one of the first user mobile electronic device and the first plurality of user mobile electronic devices, first event update data comprising at least a portion of the received event information and the received data associated with the first event. It should be appreciated that the hardware server processor may be configured to transmit the first event update data on a continuous basis, as allowed in view of the available communication channel(s) and available updates.

Some embodiments of the present approach may take the form of methods for near-real time data collection and dissemination. The method includes receiving, at a hardware server processor from a first user mobile electronic device, an event report and event data corresponding to a first event; storing the received event report and alert data in a database; identifying a plurality of user mobile electronic devices for receipt of an event alert; transmitting to the plurality of user mobile electronic devices an event alert and alert data corresponding to first event; receiving from at least one member of the plurality of user mobile electronic devices an event information and data associated with the first event, the data associated with the first event including data generated by at least one user mobile electronic device sensor and data generated by at least one user mobile electronic device camera; calculating, from the received event information and data associated with the first event, at least one of a first event location, a first event direction, a first event altitude, and a first event predicted future location; and transmitting to at least one of the first user mobile electronic device and the plurality of user mobile electronic devices, at least one of the calculated first event location, the calculated first event direction, the calculated first event altitude, and the calculated first event predicted future location.

In some embodiments, the event alert and alert data corresponding to first event includes an instruction to store data generated by at least one user mobile electronic device sensor and data generated by at least one user mobile electronic device camera. In some embodiments, the event alert and alert data corresponding to first event includes at least one of a first event location, a first event direction, a first event altitude, and a first event predicted future location. Some embodiments of the method may include updating the at least one of the calculated first event location, the calculated first event direction, the calculated first event altitude, and the calculated first event predicted future location, based on the received event information and data associated with the first event, and transmitting the update to at least one of the first user mobile electronic device and the plurality of user mobile electronic devices. Some embodiments may include identifying a second plurality of user mobile electronic devices for receipt of an event alert, based on the at least one of the calculated first event location, the calculated first event direction, the calculated first event altitude, and the calculated first event predicted future location; transmitting, to the second plurality of user mobile electronic devices, a second event alert and at least one of the calculated first event location, the calculated first event direction, the calculated first event altitude, and the calculated first event predicted future location; and receiving, from the second plurality of user mobile electronic devices, an event information and data associated with the second event alert, the data associated with the second event alert including data generated by at least one user mobile electronic device sensor and data generated by at least one user mobile electronic device camera. Some methods may include calculating at least one of an updated first event location, an updated first event direction, an updated first event altitude, and an updated first event predicted future location; and transmitting the at least one of an updated first event location, an updated first event direction, an updated first event altitude, and an updated first event predicted future location, to at least one of the first user device, the plurality of user mobile electronic devices, and the second plurality of user mobile electronic devices.

It should be appreciated that some embodiments may take the form of a mobile electronic device having at least one sensor, at least one camera, at least one communication channel configured to send and receive data, local non-transient memory configured to store data generated by the at least one sensor, data generated by the at least one camera, and data received, and a mobile device processor configured to operate a software app as described herein. The software app may include instructions for sending an event report and event data to a hardware server, receiving an event alert and alert data from a hardware server, and sending and receiving event information and data, including updated data, to and from the hardware server, through the at least one communication channel. Upon receiving an event alert and alert data from a hardware server, the software app instructs the mobile device processor to store data generated by the at least one sensor and data generated by the at least one camera as data associated with an event, and transmit the same to the server. These and other embodiments are possible as described below and illustrated in the accompanying drawings.

Phenom, one demonstrative embodiment of the present approach, is an app for mobile systems such as smartphones and Smart pads using the Android operating system, the Windows Mobile Operating system, the iOS operating system, or other mobile operating system. Phenom advantageously uses the widespread, ubiquitous connectivity to smartphones, and the Internet and social networks, software applications and cameras, Phenom will use of mobile app camera and other sensors to capture, record, record, storage, transmission, correlation, analyze and verify the existence of unexplained phenomena, and to create a crowd-sourcing event while doing so. Through the crowd sourcing event, we shall capture all available sensor data for scientific analysis.

DETAILED DESCRIPTION

Figure 1:
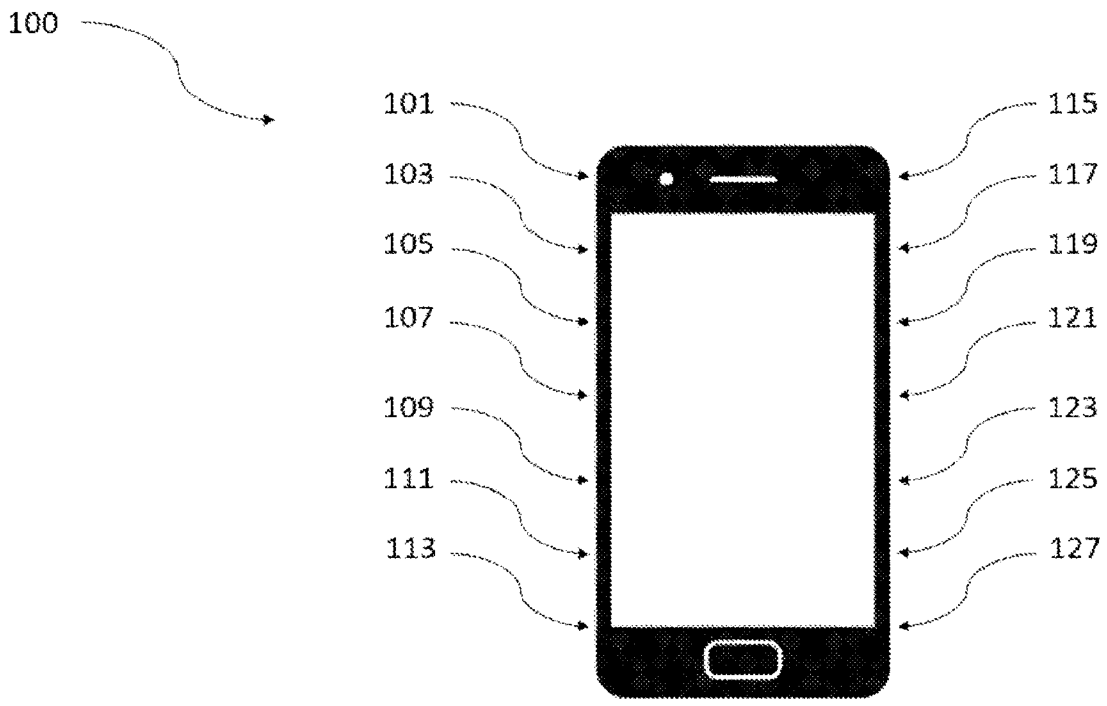
FIG. 1 illustrates a generic portable electronic device having a plurality of sensors and supporting functionality.

The following description illustrates aspects and embodiments of the present approach. The present approach employs the widespread and ubiquitous connectivity of smartphones, the Internet, social networks, software applications and cameras, to selectively capture from a plurality of user devices, in specific geographical locations, image, sound, sensor, and location data relating to a target activity, and beneficially generate a crowd-sourced event relating to the target activity, such as an accident or a crime taking place. The compiled data is then available for use in analyzing the target activity.

The present approach advantageously uses crowdsourcing to gather information related to a fleeting event from multiple sources, transmit the data to a centralized location for aggregation and processing, and in some embodiments provide analyzed, aggregated data to one or more users. As used herein, a fleeting event is an event that may be transitory, unusual or rare, difficult to identify, and/or combinations thereof. For example, UFO sightings, paranormal activity sightings, and other unexplained phenomena sightings, are fleeting events. Other examples include celebrity sightings, possible criminal conduct such as human trafficking, abductions, drug dealing, and robberies, rare or endangered animal sightings, among others. Advantageously, the present approach enables near-real time event monitoring and coordination among multiple users and other interested parties, such as government agencies, local law enforcement, air traffic controllers, etc. As used herein, "near-real time" refers to the timeliness of data or information that has been delayed by the time required for data collection and electronic communication and automatic data processing. As a result, there are no significant delays in the exchange of data and/or information between users of the present approach.

In one demonstrative embodiment, a mobile app for smart phones is made available to a target population. Smart phones include numerous sensors that may provide useful data, such as the example sensors illustrated in the user device 100 shown in FIG. 1. In this example, user device 100 includes multiple sensors commonly available in smart phones: accelerometer 101, gyroscope 103, magnetometer 105, barometer 107, proximity/distance measurement 109, light sensor 111, GPS 115, front camera 125, and rear camera 127. Most of these sensors are already available on modern smart phones. It should be appreciated that in embodiments of the present approach, the mobile app is configured to request access to sensors available on user device 100, and record data using the accessible sensors as described herein. User device 100 also includes user input device (e.g., touch screen or keypad) 113 and communication channels such as Wi-Fi connectivity 117, Bluetooth connectivity 119, GSM/CDMA cellular connectivity 121, and NFC (near-field communication) 123. In embodiments of the present approach, the mobile app is configured to use input device(s) and communication channels available on the user device 100. As non-limiting examples, the target population may be amateur UFO watchers, ghost hunters, truck drivers, law enforcement, or the general public. The app receives a variety of data from users, and calculates the location of a fleeting event, e.g., any observed stable object (phenomenon/event), through triangulation. The data collected from users is discussed more below. In some embodiments, one or more users have the opportunity to create or label an event that may trigger a notice disseminated to other users. For example, the notice may be sent to other users interested in the type of event, or within a certain geographical region. In some embodiments, one or more users may review another user's event, receive information about it (e.g., location, time, category, photo, video, etc.), and optionally triangulate it based on aggregated and analyzed data. In some embodiments, for example, a user may review other user's event information on an integrated map, such as, e.g., a Google map. In some embodiments, users may communicate with each other using messages and see what the most recent events have been created within a certain area (e.g., local, state-wide, worldwide).

Figure 2:
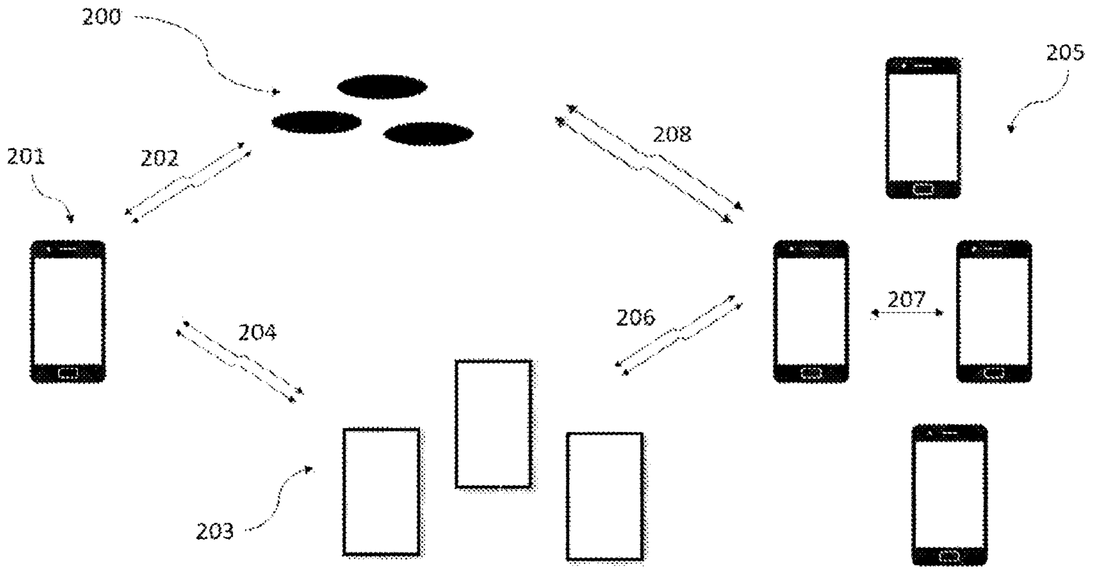
FIG. 2 illustrates a system for crowd-sourced data capturing and analysis according to an embodiment of the present approach.

FIG. 2 illustrates a system for crowd-sourced data capturing and analysis according to an embodiment of the present approach. Embodiments of the present approach employ triangulation for position/location tracking, including real-time triangulation. In some embodiments, the triangulation functionality is done on a back-end side, such as a central server or hub. The following steps demonstrate the calculation of the triangulation functionality according to one embodiment.

1. Transfer latitude and longitude data received from multiple users, relating to the same fleeting event, to Cartesian coordinates.
2. For each user's submitted data, construct an equation to identify a line of the event's location as a function of time.
3. Identify and plot intersection points between lines, as a function of time. Some embodiments utilize average intersection points to resolve inconsistencies. It should be appreciated that other methods of calculating positions based upon multiple data sets may be used without departing from the present approach.
4. Calculate probable future location(s) based on prior intersections.

As illustrated in FIG. 2, the initial user device observes a fleeting event 200, and activates the mobile app on user device 201. Then user device 201 records data 202 of the fleeting event 200, which may include available sensor data as shown in FIG. 1 and depending on the sensors available on user device 201, as well as video and sound recordings and other commentary from the initial user. User device 201 then, in near-real time, transmits event data 204 to a server 203. The initial user may first submit a report of the event to sever 203, which then distributes an event alert to teammate devices 205. Teammate devices 205 may include other individual user devices operating a mobile app according to the present approach. In some embodiments, teammate devices may include local law enforcement, government agencies, emergency responders, air traffic controllers, news agencies, etc. Some teammate devices 205 may be stationary, such as a computer system. As described below, the present approach allows multiple users of the mobile app to become teammates, and may organize teams through common geographical regions, common interests, user-defined groups (e.g., social groups), etc. It should be appreciated that server 203 may issue the event alert based on one or more criteria, such as the type of event, distance to the event, predetermined alert rules (e.g., all members of a group, or all members having expressed interest in the type of event, etc.), a geographical region containing the event, and the like. For example, in some embodiments, the server 203 may issue an event alert to any teammate devices 205 within a geographical region based on the user device 201 location or the location of fleeting event 200, such as within 1 mile, or 2 miles, or 3 miles, or 4 miles, or 5 miles, or 6 miles, or 7 miles, or 8 miles, or 9 miles, or 10 miles, or 15 miles, or 20 miles, or 25 miles, or 30 miles, or a pre-defined distance from either user device 201 or fleeting event 200 location. In some embodiments, the event report may be issued by server 203 to teammate devices 205 within a zip code, within a city or county, and/or to one or more teammate devices 205 regardless of location/distance. In the FIG. 2 example, teammate devices 205 receive an event alert from server 203 over communication channel 206 in near-real time, i.e., within the time it takes user device 201 to send an initial event report to server 203 over communication channel 204, then for server 203 to identify the appropriate teammate devices 205 and issue an event report to those teammate devices 205 over communication channel 206. It should be appreciated that after the initial user device 201 transmits an event report, user device 201 may become part of teammate devices 205 for further data collection, data sharing, event updates, etc., with respect to fleeting event 200.

In some embodiments, user device 201 submits data to server 203 on a continuous basis. In such embodiments, server 203 may issue event alert updates to teammate devices 205. For example, submitted data from user device 201 may include fleeting event 200 direction and velocity, as well as changes in location, altitude, heading, etc. The additional submitted data may be transmitted to server 203, and then server 203 may then issue an event alert update to teammate devices 205 with updates or changes in event location, direction, altitude, heading, etc. In some embodiments, server 203 may calculate predicted future locations of fleeting event 200 based on submitted data, and then server 203 may issue event alert updates based on and/or including predicted future locations. In some embodiments, server 203 may issue event alerts to additional teammate devices 205 based on changes in event location, direction, altitude, heading, etc., and/or predicted future locations of fleeting event 200.

Upon receiving an event alert, teammate devices 205 record data 208 of the fleeting event 200, which may include available sensor data as shown in FIG. 1 and depending on the sensors available on the various user devices of teammate devices 205, as well as video and sound recordings and other commentary from the teammate users. One or more teammate devices 205 then, in near-real time, transmit event data through communications channel 206 to server 203. As described below, server 203 may continuously aggregate any submitted data and triangulate event location, provide updates on the event to users and other interested parties (e.g., local law enforcement, government agencies, air traffic controllers, etc.), all in near-real time. Server 203 may provide updated event information to teammate devices 205 on a continuous basis, i.e., without delay (near-real time) and as updates are available. In some embodiments, teammate devices 205 may exchange direct messages and share data through communications channel 207 and may also exchange direct messages and share data with initial user 201 through server 203 and communications channels 204 and 206. In this manner, initial user device 201 and teammate devices 205 continue to capture available data relating to fleeting event 200, and benefit from near-real time updated information on event location, direction, altitude, heading, etc., and/or predicted future locations of fleeting event 200.

In some embodiments, server 203 may employ lean algorithms with respect to event alerts and event alert updates. For example, server 203 may be configured to transmit event alerts and event alert updates to teammate devices 205 using few or minimal algorithmic steps, to increase the near-real time transmission. As another example, server 203 may perform calculations on predicted future locations of fleeting event 200 on a separate control loop from transmitting event alerts and event alert updates, so that future location calculations do not impose any significant delays to event alert and/or event alert update transmissions.

In some embodiments, teammate devices 205 may transmit data directly between devices using communications channel 207, in addition to or independent from data submissions to server 203. The direct communications channel 207 allows for near-real time data exchange and coordination between users. For example, one teammate device may have access to ADS-B data, as described below, and may transmit ADS-B data to server 203 and other teammate devices 205. In this example, the fleeting event 200 can be compared to known aircraft in the region by server 203 and other teammate devices 205. In this manner, one or more users may be given the option of classifying the fleeting event 200 as an aircraft based on ADS-B data.

Figure 3:
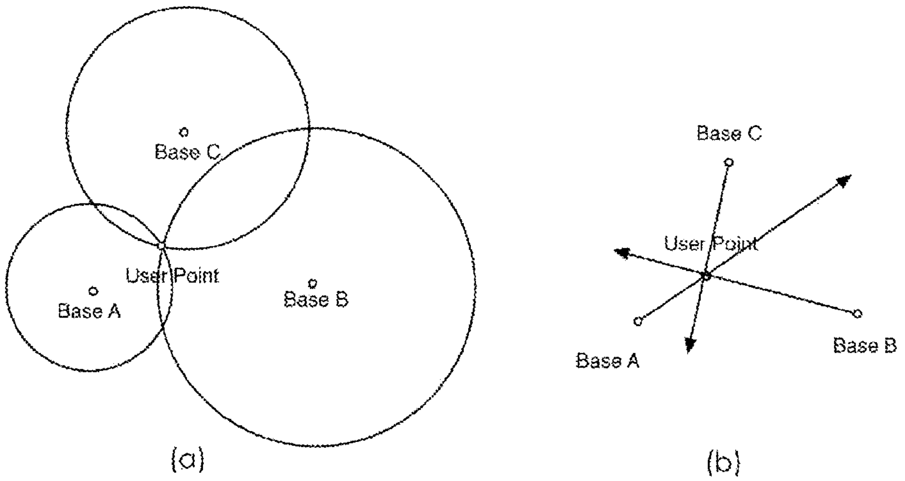
FIG. 3 shows an example of (a) data collection from a plurality of reports, and (b) triangulation based on the collected data.

FIG. 3 shows an example of (a) data collection from a plurality of reports, and (b) triangulation based on the collected data. In FIG. 3(*a*), data is received from users A, B, and C, indicating event positions labelled as "Base A," "Base B," and "Base C." FIG. 3(*b*) shows how the system triangulates a location of the event from the received user data, and provides a "User Point" to identify the triangulated location of the event. It should be appreciated that embodiments of the present approach may continuously calculate and update the event location and predecited future location(s). In some embodiments, the server 203 may continuously transmit event location and predecited future location(s) to one or more user devices.

One demonstrative embodiment of the present approach is the Phenom app, deployable on mobile systems such as smart phones and smart pads, using operating systems known in the art such as, e.g., the Android operating system, the Windows Mobile Operating system, the iOS operating system, or other mobile operating systems. This embodiment focuses on crowd-sourced events relating to fleeting events, such as unexplained phenomena. For example, Phenom will use a mobile device camera and other available sensors and memory to capture, record, store, transmission, correlation, analyze, and verify the existence of unexplained phenomena (a "fleeting event" as referenced herein), and to create a crowd-sourcing event while doing so. When an unexplained phenomena or "event" is identified in a specific geographical area, mobile devices with the Phenom app in that specific geographical location will be activated to for data collection and submission. Alternatively, mobile devices with the Phenom app in have joined a specific team or group will be activated upon receiving an event report by a member of that team or group or tagged as pertaining to that team or group. Through the crowd sourcing event, Phenom captures any or all available sensor data from each mobile device in the specific geographical location or of that team or group, for collection, organization, and further analysis (e.g., scientific analysis).

Figure 4:
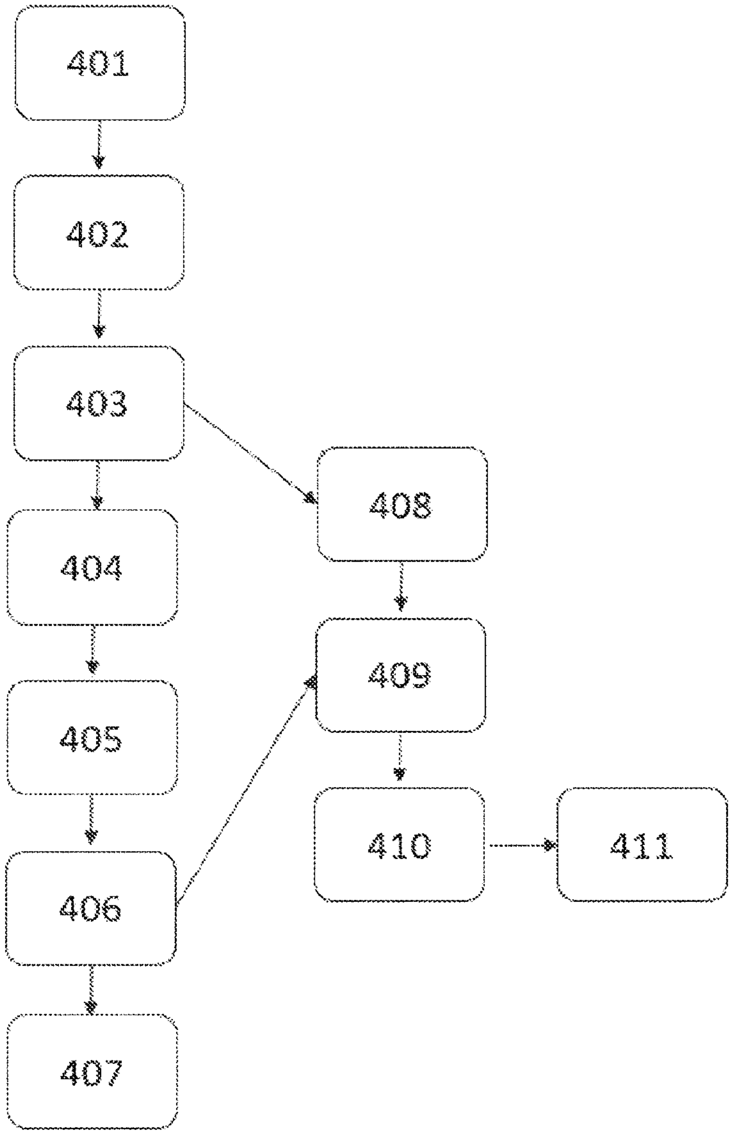
FIG. 4 shows a flow chart of near-real time crowd-sourced data collection according to an embodiment of the present approach.

In this demonstrative embodiment, mobile crowdsourcing is used to support a community interested in a specific fleeting event, or a category of fleeting events. The system allows the community to identify, characterize, and investigate the fleeting event. Generally and as illustrated in FIG. 4, a first user observes the fleeting event 401, and reports the observation 402 through a user interface on a mobile device, e.g., a smart phone app. A central server or "system" receives the report and identifies secondary teammates or users 403 for receiving the event report. The event report may then be transmitted to a group of users 404, which may be determined depending on the particular embodiment as described herein. For example, the group may be a predefined plurality of teammates, other users within a certain geographical area, or other users having been identified as interested in the specific fleeting event or a category containing the observed fleeting event. The system may then issue an event alert 405, and then request the group of users to initiate data collection. The data collection may be mobile device sensor data, photographic images, video data, etc. The system then collects the data submitted from the group of users 406, and provides near real-time reporting of the fleeting event, such as, e.g., triangulating fleeting event location, velocity and trajectory, characteristics, etc. The system then transmits submitted data (all or a portion) to other users or teammates 407 active in connection with the event, or otherwise associated with the team or group. It should be appreciated that steps 404-407 may continue repeat until the event has terminated as described below. It should also be appreciated that a user may be given the option to stop receiving event updates for a given event. The near-real time disseminating of data in this manner keeps users informed and coordinated in the status and continued monitoring of the event, and also allows for data aggregation and subsequent analysis.

In some embodiments, the system may notify one or more users that other users are also actively collecting data on the event, providing a valuable reassurance that an individual is not alone. This may be especially advantageous when the fleeting event involves certain events, such as an unidentified flying object, paranormal activity, or dangerous criminal activity. This is also useful to coordinate law enforcement, first responders, and the like.

In some embodiments, the system simultaneously initializes event location tracking, triangulation, and predicted future location calculations 408. The system may incorporate additional submitted data from step 406 in performing ongoing event location tracking, triangulation, and predicted future location calculations 409. The system disseminates ongoing event location tracking, triangulation, and predicted future location calculations to users 410, to enable continued event monitoring and coordination. In some embodiments, the system also notifies additional users based on the predicted future location calculations 411, to improve the likelihood of users being present as the event proceeds. The system may continue updating event location tracking, triangulation, and predicted future location calculations, and steps 409 and 410 may continue on repeat until the event has terminated as described below.

Embodiments of the present approach may use one or more methods for determining that an event has concluded. The system may start a timer following the initial event report, and automatically end the event after, e.g., 5 minutes, 10 minutes, 15 minutes, 20 minutes, 25 minutes, 30 minutes, 1 hour, or 5-minute or 10-minute increments after the 1-hour mark. In some embodiments, the system may end the event after a defined time has elapsed following the last user submitted data, e.g., 5 minutes, 10 minutes, 15 minutes, 20 minutes, 25 minutes, 30 minutes, 1 hour, or 5-minute or 10-minute increments after the 1-hour mark. In some embodiments, the system may end the event after one or more users indicate on the mobile app that the event is no longer occurring. The system may, for example, require a threshold number of users to indicate that the event is no longer occurring. The threshold may be, for example, an integer between 1 and 100, such as 5 or 10, or a percentage of users in the team or group, or a percentage of users involved in the event (e.g., receiving event alerts and/or event updates, submitting data), such as 5%, 10%, 15%, 20%, 25%, 30%, 35%, 40%, 45%, 50%, or more in increments of, e.g., 1% or 5%. In some embodiments, an operator of the system may determine when to end an event. It should be appreciated that an embodiment may employ one or more methods to end an event.

After the fleeting event has ended, or a certain time after the initial report, the system may issue requests for more thorough post-event reporting on the user's observations. For example, the system may issue a pre-determined series of questions, request corroboration of certain facts or data, or invite other input and information from the user. In some embodiments, all or portions of the post-event reporting may be made available to other users, or a subset of users. In some embodiments, data, user reports, and analytics from the system, may be transmitted to a relevant third-party organization, such as a government agency responsible for investigating the fleeting event (e.g., law enforcement), or private organizations involved in studying and reporting the fleeting event (e.g., UFO watch groups, paranormal activity groups, etc.).

As a mobile device application or app, Phenom can be voluntarily downloaded as an app by users to mobile devices, and each user can authorize the app to collect data in the event of being present in a specific geographical area during a target fleeting event, such as an unexplained phenomena. The application allows users to register with a central server, referred to as the Auth firebase flow for this embodiment, and optionally become teammates. Then the user appears on the teammates'list screen. Teammates may be people that are connected to the initial user, such as friends or members of common interest groups, such as people that want to be "in the know" about an event or events, especially if they are close enough to the event and can be alerted in time to have a sighting of their own. A teammate may be alerted all events globally in near-real-time. The more teammates on the Phenom network, the more successful a crowd sourcing event or sighting can be; because we have to "Collaborate to Graduate" to collect and analyze the data behind anomalous phenomena and event. In some embodiments, Teammates can be anonymous. In some embodiments, teammates who are not anonymized may be entered into a ladder system, where the winners can win prizes, such as include interviews, equipment and trips around the World.

A crowd-sourcing event may be triggered by a user of the system. Any single user or individual in a crowd can open the app and report a first instance of a fleeting event, such as an unexplained phenomena. This action of recording and sending an event notification may start a crowd sourcing event. The user may aim a mobile device camera at the fleeting event, and the app will record video or images, as well as various sensor data available on the device. For example, in one embodiment the Phenom app captures at least 1 image and 15 seconds of video. And if the user is happy with the captured images and/or video, then the user may submit the image(s) and video, along with any data, through activating a "send button" on the user interface. After the send button is hit, a single image and a 15 seconds of video go to the user's teammates so that they can try and see the same object, the teammates will use their Phenom app to capture an image and video and repeat as the first user did to their teammates, and so on, and so on. At the same time that each user sends out his Phenom text alert, each users Phenom alert is received and stored in the Phenom Server. The Phenom Server will forward a copy to the Phenom AI/ML system called PhenomAInom. This AI/ML is designed with Object Recognition, and will learn to identify different anomalous activities, events and sighting and will assign a confidence level of accuracy after it has looked for spoofing and deep fakes. The AI/ML system will then send a confidence level report to the Phenom website for users and viewers to discuss, collaborate and educate each other on new events and sightings. The Phenom event signal is sent via standardized text to get the Crowd sourcing started.

Embodiments of the present approach may be configured to collect crowd-sourced event data for a desired time period, and in some instances at certain geographical locations. Depending on the embodiment, the geographical location for data collection may change over time, such as if initial data indicates that the target event is moving. For example, the Phenom application seeks to capture data relating to a fleeting event, such as a stable event, and calculate the exact position of the event (which may involve an individual or group, animal(s), unknown entity or object, activity, etc.). A stable event is one that does not impact the user safety, which may be paramount for some embodiments. In contrast, some fleeting events may involve an unstable event, such as suspected criminal activity, dangerous animal sightings, and other potentially harmful events. Depending on the embodiment, a report of an unstable event may trigger warnings to users, and notifications to relevant law enforcement and/or other third parties. In the Phenom example, data collection may be specific to the type of fleeting event, and preferably includes capturing one or more photos and, if available, a 15-30 second video with metadata useful for performing triangulation functionality is made. The data also includes whatever smart phone sensor data is available and authorized for collection by the user. Preferably, the event creator is the first user that reported the fleeting event.

In the Phenom embodiment, after a user posts the first instance of a target event, other users within a defined set of criteria receive notification from the Phenom app. For example, the additional users may be teammates, or in a specific geographical location. The posted event is made available on the home screen for each user. In some embodiments, the posted event may be viewable in a collapsed view but can be explored while pressing on the "see more" option. In addition, the users can see the event on the map. The map has the User's ID marker and shows where the User is looking while doing the shot.

Some embodiments may include a feature allowing a user to post a report about a target event within a defined group, such as a set of other users, a plurality of users that have joined a group (e.g., a group having a defined subject matter, common interest, geographical region, and the like), or other collection of users.

The report may include the user's data collected in connection with the event. In some embodiments, the user may receive a prompt to provide a debrief or story. For example, in some embodiments the user receives a prompt to record and publish a debrief. If the user accepts the prompt, the user's device may proceed to record sound and or video, during which the user may provide verbal comments on the event. The user may elect to turn off the camera, or altogether pass on the opportunity. In some embodiments, the user may be prompted to answer questions relating to the event, such as:

Describe what you just witnessed.
What colors did you see?
What shape(s) did you observe?
How many objects did you see?
What was unusual about what you saw?
How did the event make you feel?
How long was the event?
Did you experience any missing time?
If so, how much missing time?
Anything unusual about the location?

It should be appreciated that some embodiments may provide visual indicators of one or more prompts, allowing the user to respond to the prompt and then click or press an indicator to proceed to the next prompt, rewind and repeat a portion of the debrief relating to the prompt, review the user's recorded response, and/or end the recording and post the debrief.

Some embodiments may incorporate Automatic Dependent Surveillance-Broadcast (ADS-B) data. In some countries, such as the United States, all aircraft (except military) emit a transponder code providing information such as:

The airline operating the aircraft;
The type of aircraft;
Aircraft bearing;
Aircraft altitude;
Aircraft speed;
Range from last airfield; and
Range to destination airfield.

As explained by the United States Federal Aviation Administration, ADS-B Out works by broadcasting information about aircraft GPS location, altitude, ground speed and other data to ground stations and other aircraft. The information is broadcast once every second. This offers more precise tracking of aircraft compared to radar technology, which sweeps for position information every 5 to 12 seconds. ADS-B In provides operators of properly equipped aircraft with weather and traffic position information delivered directly to the cockpit. ADS-B In-equipped aircraft have access to the graphical weather displays in the cockpit as well as text-based advisories, including Notices to Airmen and significant weather activity. Embodiments of the present approach may be configured to receive ADS-B data and record such data upon one or more triggering events. For example, user devices within a certain geographical region may receive a message to record ADS-B data after a user reports an event. As another example, a user's device may record ADS-B data when that user indicates an event, such as through a post or other interaction with a system. The ADS-B information is useful for identifying aircraft that may have been in the vicinity of an event, such as an aircraft that was mistaken for a UFO.

In some embodiments, a fleeting event can be triangulated while pressing the triangulation button, and the camera screen opens. A user who sees the same event can capture and submit data relevant to the event, and can review the event's reported and predicted location(s) and other relevant information. In some embodiments, submitted data relating to the event is automatically shared or made available to other users.

In the Phenom example, a user can add their data to the reports on a particular event, and Phenom can re-triangulate the event based on the added data. The more data available, the more precise the Phenom triangulation capability becomes with respect to locating the event. The users can also exchange messages with each other in some embodiments. In addition, the chat functionality allows you to exchange media files, create groups, and private chats. In some embodiments, users can see the most recent event reports or data submissions captured relating to a particular event, inside the application.

In addition to data sharing and triangulation, embodiments of the present approach allow users to initiate a multi-sensory data collect from a smart device. The multi-sensory data depends on the device and available sensors, and can include, e.g., Bearing, Range, Altitude Azimuth (BRAA) with precise location with unique smart device tools and sensor to enhance the capture data based on its ability to help a user "Detect, Locate Track, Identify and Characterize" an event, object or sighting in near-real-time (usually less than 1 minute).

There are a variety of features that may be included in embodiments of the present approach. The beneficial use of crowd-sourcing to rapidly gather and analyze data relating to a specific fleeting event, and/or categories of fleeting events, enables users interested in the event to more thoroughly understand and observe the event.

Some embodiments may also provide approximate altitude triangulation. In some embodiments, the triangulation functionality is done on the back-end (i.e., system) side. Altitude triangulation may be performed by any means known in the art. For example, in some embodiments the latitude and longitude data may be translated to cartesian coordinates, from which linear equations are prepared. Intersection points between lines may be identified, and the average of all intersection points identified as the approximate altitude of an event.

It should be appreciated that the user interface may vary from one embodiment to another. Generally, the user interface may include one or more of the following data fields during an event tracking or observation: Latitude, Longitude, Altimeter, Pressure, GMT Time, Local time, Accelerometer, UTM Easting, UTM northing, Gyroscope, Magnetometer, among others.

In some embodiments, the user data submissions are configured to prevent data manipulation. For example, the Phenom App syncs Exif file time with CPS time and location for anomalies. EXIF is short for Exchangeable Image File, a format that is a standard for storing interchange information in digital photography image files using JPEG compression. Of course, other data file formats may be used without departing from the present approach.

In some embodiments, a user can categorize and/or display what type of anomalies/activities are being reported in a chat function. This may include, for example, UAP/UFO, Cryptozoology, Paranormal, Criminal, Misc, and Phenom Master Chat, among others.

A user may add Observables for a fleeting event in some embodiments. This may include, for example, sudden and instantaneous acceleration, hypersonic velocities without signatures, low observability, trans-medium travel, positive lift, and biological effects.

In some embodiments, a user can see the details of an active fleeting event. Event details may contain one or more of a photo and/or video of the event, date, the initialing user, type of event, description, data collected from the smart phone, observables, list of triangulations, and the like.

As will be appreciated by one of skill in the art, the present approach may be embodied as a method, system, and at least in part, on a computer readable medium, including non-transitory computer media. Accordingly, the present approach may take the form of combination of hardware and software embodiments (including firmware, resident software, micro-code, etc.) or an embodiment combining software and hardware aspects that may all generally be referred to herein as a "circuit," "module" or "system." Furthermore, embodiments of the present approach may take the form of a computer program product on a computer readable medium having computer-usable program code embodied in the medium. The present approach might also take the form of a combination of such a computer program product with one or more devices, such as a modular sensor brick, systems relating to communications, control, an integrate remote control component, etc. In some embodiments, the present approach takes the form of computer program applications operating on a plurality of mobile devices, such as smart phones, and one or more server systems.

Any suitable non-transient computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transient computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any non-transient medium that can contain, store, communicate, propagate, or transport the program for use by or in connection with the instruction execution system, apparatus, or device.

Computer program code for carrying out operations of the present approach may be written in an object oriented programming language such as Java, C++, etc. However, the computer program code for carrying out operations of the present approach may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present approach is described below with reference to flowchart illustrations and/or block diagrams of methods, apparatus (systems) and computer program products, as well as software description documents appended hereto, according to embodiments of the approach. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable memory, including a networked or cloud accessible memory, that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to specially configure it to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface (GUI) presented on the display of the mobile communications device or the like. Prompts may also be audible, vibrating, etc. Any flowcharts and block diagrams in the Figures illustrate the architecture, functionality, and operation of possible implementations of systems, methods and computer program products according to various embodiments of the present approach. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The invention may be embodied in other specific forms without departing from the spirit or essential characteristics thereof. The present embodiments are therefore to be considered in all respects as illustrative and not restrictive.

What is claimed is:

1. A system for near-real time data collection and dissemination, the system comprising:

a plurality of user mobile electronic devices, wherein each user mobile electronic device comprises at least one sensor, at least one camera, at least one communication channel configured to send and receive data, local non-transient memory configured to store data generated by the at least one sensor, data generated by the at least one camera, and data received, and a mobile device processor configured to send an event report and event data, receive an event alert and alert data, and send and receive event information and data, through the at least one communication channel;

wherein upon receiving an event alert and alert data, the mobile device processor is configured to store data generated by the at least one sensor and data generated by the at least one camera as data associated with an event;

at least one hardware server processor configured to receive a first event report and first event data from a first user mobile electronic device pertaining to a first event, identify a first plurality of user mobile electronic devices, transmit a first event alert and first alert data to the first plurality of user mobile electronic devices, receive event information and data associated with the first event from the first plurality of user mobile electronic devices;

wherein the at least one hardware server processor is further configured to store in a database the first event report, the first event data, received event information, and received data associated with the first event.

2. The system of claim 1, wherein the at least one sensor is selected from the group consisting of an accelerometer, a gyroscope, magnetometer, barometer, proximity measurement, light sensor, and GPS.

3. The system of claim 1, wherein at least one user mobile device comprises a plurality of sensors.

4. The system of claim 1, wherein the at least one communication channel is selected from the group consisting of Wi-Fi connectivity, Bluetooth connectivity, cellular connectivity, and near-field communication.

5. The system of claim 1, wherein the first event is selected from the group consisting of aircraft spotting, endangered animal monitoring, unidentified object monitoring, paranormal activity, and criminal activity.

6. The system of claim 1, wherein the at least one hardware server processor is configured to calculate at least one of first event location, first event direction, first event altitude, and first event predicted future location, based on the first event data.

7. The system of claim 6, wherein the at least one hardware server processor is further configured to transmit the calculated at least one of first event location, first event direction, first event altitude, and first event predicted future location, to the first plurality of user mobile electronic devices.

8. The system of claim 6, wherein the at least one hardware server processor is further configured to calculate at least one of first event location, first event direction, first event altitude, and first event predicted future location, based on received event information and data associated with the first event.

9. The system of claim 8, wherein the at least one hardware server processor is further configured to transmit the calculated at least one of first event location, first event direction, first event altitude, and first event predicted future location, to at least one of the first user mobile electronic device and the first plurality of user mobile electronic devices.

10. The system of claim 9, wherein the at least one hardware server processor is further configured to transmit a change alert to at least one of the first user mobile electronic device and the first plurality of user mobile electronic devices, the change alert comprising an indication of a change in at least one of the first event location, the first event direction, the first event altitude, and the first event predicted future location.

11. The system of claim 9, wherein the at least one hardware server processor is further configured to identify a second plurality of user mobile electronic devices based on at least one of the first event location, the first event direction, the first event altitude, and the first event predicted future location; transmit a second event alert and second alert data to the second plurality of user mobile electronic devices; and receive event information and data associated with the first event from the second plurality of user mobile electronic devices.

12. The system of claim 1, wherein the received data associated with the first event comprises a plurality of images and associated location data, and the at least one hardware server processor is further configured to generate and store in the database a composite image of the first event based on the plurality of images and associated location data, and transmit the composite image of the first event to at least one of the first user mobile electronic device and at least one member of the first plurality of user mobile electronic devices.

13. The system of claim 1, wherein the at least one hardware server processor is further configured to transmit to at least one of the first user mobile electronic device and the first plurality of user mobile electronic devices, first event update data comprising at least a portion of the received event information and the received data associated with the first event.

14. The system of claim 13, wherein the at least one hardware server processor is further configured to transmit the first event update data on a continuous basis.

15. A method for near-real time data collection and dissemination, the method comprising:

receiving, at a hardware server processor from a first user mobile electronic device, an event report and event data corresponding to a first event;

storing the received event report and alert data in a database;

identifying a plurality of user mobile electronic devices for receipt of an event alert;

transmitting to the plurality of user mobile electronic devices an event alert and alert data corresponding to first event;

receiving from at least one member of the plurality of user mobile electronic devices an event information and data associated with the first event, the data associated with the first event including data generated by at least one user mobile electronic device sensor and data generated by at least one user mobile electronic device camera;

calculating, from the received event information and data associated with the first event, at least one of a first event location, a first event direction, a first event altitude, and a first event predicted future location;

transmitting to at least one of the first user mobile electronic device and the plurality of user mobile electronic devices, at least one of the calculated first event location, the calculated first event direction, the calculated first event altitude, and the calculated first event predicted future location.

16. The method of claim 15, wherein the event alert and alert data corresponding to first event includes an instruction to store data generated by at least one user mobile electronic device sensor and data generated by at least one user mobile electronic device camera.

17. The method of claim 15, wherein the event alert and alert data corresponding to first event includes at least one of a first event location, a first event direction, a first event altitude, and a first event predicted future location.

18. The method of claim 15, further comprising updating the at least one of the calculated first event location, the calculated first event direction, the calculated first event altitude, and the calculated first event predicted future location, based on the received event information and data associated with the first event, and transmitting the update to at least one of the first user mobile electronic device and the plurality of user mobile electronic devices.

19. The method of claim 18, further comprising identifying a second plurality of user mobile electronic devices for receipt of an event alert, based on the at least one of the calculated first event location, the calculated first event direction, the calculated first event altitude, and the calculated first event predicted future location;

transmitting, to the second plurality of user mobile electronic devices, a second event alert and at least one of the calculated first event location, the calculated first event direction, the calculated first event altitude, and the calculated first event predicted future location;

receiving, from the second plurality of user mobile electronic devices, an event information and data associated with the second event alert, the data associated with the second event alert including data generated by at least one user mobile electronic device sensor and data generated by at least one user mobile electronic device camera.

20. The method of claim 19, further comprising calculating at least one of an updated first event location, an updated first event direction, an updated first event altitude, and an updated first event predicted future location; and transmitting the at least one of an updated first event location, an updated first event direction, an updated first event altitude, and an updated first event predicted future location, to at least one of the first user device, the plurality of user mobile electronic devices, and the second plurality of user mobile electronic devices.

* * * * *